United States Patent
Tomizawa et al.

(10) Patent No.: US 10,275,940 B2
(45) Date of Patent: Apr. 30, 2019

(54) IMAGE PROCESSING DEVICE, IMAGE PROCESSING METHOD, AND IMAGE PROCESSING PROGRAM

(71) Applicant: TOPCON CORPORATION, Itabashi-ku, Tokyo (JP)

(72) Inventors: Ryosuke Tomizawa, Tokyo (JP); Daisuke Sasaki, Tokyo (JP); Takeshi Sasaki, Tokyo (JP); Nobuyuki Fukaya, Tokyo (JP); Tadayuki Ito, Tokyo (JP)

(73) Assignee: TOPCON CORPORATION, Itabashi-Ku, Tokyo (JP)

( * ) Notice: Subject to any disclaimer, the term of this patent is extended or adjusted under 35 U.S.C. 154(b) by 0 days.

(21) Appl. No.: 15/677,348

(22) Filed: Aug. 15, 2017

(65) Prior Publication Data
US 2018/0053344 A1 Feb. 22, 2018

(30) Foreign Application Priority Data
Aug. 17, 2016 (JP) .................. 2016-160193

(51) Int. Cl.
*G01C 11/02* (2006.01)
*G06T 17/05* (2011.01)
*G06T 7/70* (2017.01)

(52) U.S. Cl.
CPC ............... *G06T 17/05* (2013.01); *G06T 7/70* (2017.01); *G06T 2207/10032* (2013.01); *G06T 2207/30181* (2013.01); *G06T 2210/61* (2013.01)

(58) Field of Classification Search
CPC . G06T 17/05; G06T 2219/2012; G06T 19/20; G06T 2207/10032; G06T 7/10; G06T 1/0021; G01C 11/00; G01C 11/02
See application file for complete search history.

(56) References Cited

U.S. PATENT DOCUMENTS

| | | | |
|---|---|---|---|
| 6,354,737 B1 * | 3/2002 | Hufe ...................... | G01N 23/04 235/462.01 |
| 6,700,612 B1 * | 3/2004 | Anderson ............ | H04N 1/0035 348/333.05 |
| 2015/0234055 A1 * | 8/2015 | Ashjaee ................. | G01C 11/02 701/2 |

FOREIGN PATENT DOCUMENTS

JP 2013-096745 A 5/2013

* cited by examiner

*Primary Examiner* — Ke Xiao
*Assistant Examiner* — Andrew Shin
(74) *Attorney, Agent, or Firm* — Chiesa Shahinian & Giantomasi PC

(57) ABSTRACT

A technique enables intuitive understanding of a directional relationship between a photographed image and a wide area image, such as an electronic map. An image processing device includes a display controlling unit that displays a quadrangular-shaped photographic image, which is photographed from an aerial vehicle, displays a mark indicating a photographing position of the quadrangular-shaped photographic image, on a wide area image, and performs highlight display in accordance with a corresponding relationship between a direction of the quadrangular-shaped photographic image and a direction of the mark.

7 Claims, 2 Drawing Sheets

IMAGE PROCESSING DEVICE, IMAGE PROCESSING METHOD, AND IMAGE PROCESSING PROGRAM

CROSS-REFERENCE TO RELATED APPLICATION

This application is based upon and claims the benefit of priority from Japanese Patent Application No. 2016-160193, filed Aug. 17, 2016, the entire contents of which are incorporated herein by reference.

BACKGROUND OF THE INVENTION

Technical Field

The present invention relates to an image processing technique.

Background Art

For example, a technique for obtaining a three-dimensional model of the topography of an object based on image data is publicly known. The image data may be obtained by photographing a civil engineering worksite or other object from the air. The image data is three-dimensional topographic data in which the topography of the object is modeled as electronic data. One such technique is disclosed in, for example, Japanese Unexamined Patent Application Laid-Open No. 2013-96745. In this technique, the photographed images must be linked with flight data or map data. The photographing is typically performed by a manned or unmanned aerial vehicle, but photographing using an autonomously flying unmanned aerial vehicle (UAV) equipped with a camera has increased in recent years.

The above technique uses application software that enables visually displaying relationships among enormous numbers of photographed images, which are photographed from an aerial vehicle, a flight path of the aerial vehicle, electronic map information, and other information to perform post processing of data. The displayed screen using the software shows a map view, which shows a photographing position in the electronic map, and a photographed image in a separate manner, and is designed to enable understanding the relationship between the photographing position and the photographed image.

SUMMARY OF THE INVENTION

This technique desirably provides easiness of intuitively understanding the map view and the direction of the photographed image. An object of the present invention is to provide a technique that enables intuitive understanding of a directional relationship between a photographed image and a wide area image, such as an electronic map.

A first aspect of the present invention provides an image processing device including a display controlling unit. The display controlling unit displays a quadrangular-shaped photographic image, which is photographed from an aerial vehicle, displays a mark indicating a photographing position of the quadrangular-shaped photographic image, on a wide area image, and performs highlight display in accordance with a corresponding relationship between a direction of the quadrangular-shaped photographic image and a direction of the mark.

According to a second aspect of the present invention, in the invention according to the first aspect of the present invention, the highlight display may be performed by highlighting a side of the quadrangular-shaped photographic image, which corresponds to a specific side of the mark.

A third aspect of the present invention provides an image processing method including displaying a quadrangular-shaped photographic image, which is photographed from an aerial vehicle, displaying a mark indicating a photographing position of the quadrangular-shaped photographic image, on a wide area image, and performing highlight display in accordance with a corresponding relationship between a direction of the quadrangular-shaped photographic image and a direction of the mark.

A fourth aspect of the present invention provides a non-transitory computer recording medium storing computer executable instructions that, when executed by a computer processor, cause the computer processor to display a quadrangular-shaped photographic image, which is photographed from an aerial vehicle, display a mark indicating a photographing position of the quadrangular-shaped photographic image, on a wide area image, and perform highlight display in accordance with a corresponding relationship between a direction of the quadrangular-shaped photographic image and a direction of the mark.

The present invention provides a technique that enables intuitive understanding of a directional relationship between a photographed image and a wide area image, such as an electronic map.

PREFERRED EMBODIMENTS OF THE INVENTION

A technique of processing photographed images will be described hereinafter. The photographed images may be obtained by photographing the ground from an autonomously flying unmanned aerial vehicle (UAV) while the UAV flies. The UAV is equipped with a camera, a global navigation satellite system (GNSS) unit (location measuring unit using a navigation signal from a navigation satellite, such as a GPS satellite), and an inertial measurement unit (IMU). The UAV is capable of autonomous flight along a predetermined flight path and taking photographs of the ground. The photographing is performed at a specific interval, such as an interval of one second or two seconds, by slightly shifting the photographing area along a time axis to take multiple images of which parts overlap each other. A flight log relating to the flight path, image data of the photographed images, and data of the photographing times and the photographing positions are recorded in association with each other. These data are collected later and are used to generate a three-dimensional model and for various analyses with respect to the photographed ground.

Figure 1:
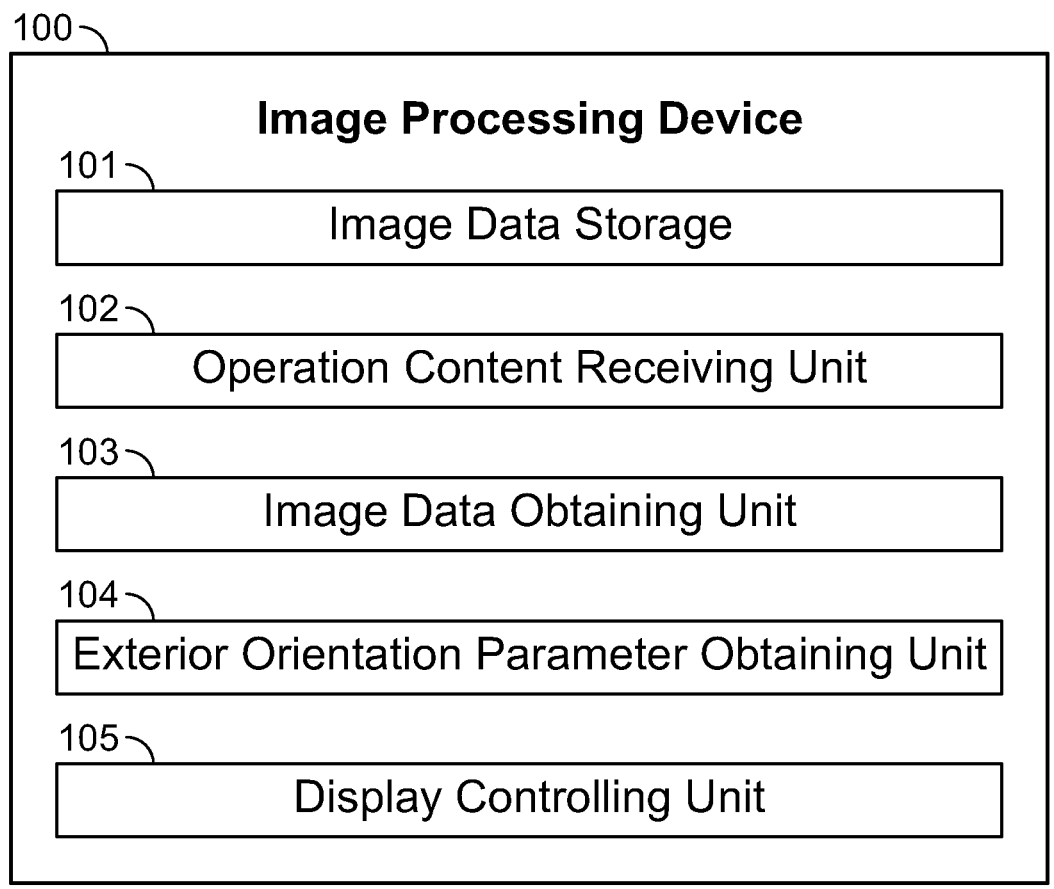
FIG. 1 is a block diagram of an embodiment.

FIG. 1 shows an image processing device 100. The image processing device 100 is configured to perform generation of a three-dimensional model and various kinds of processing and analyses based on photographic images that are photographed from a UAV as described above. Typically, the image processing device 100 is constructed not by dedicated hardware but by application software using a personal computer (PC). The application software may be installed in the PC and is operated to execute the function of the image processing device 100.

Each of the functional units shown in FIG. 1 may be constructed of a dedicated operation circuit. A functional unit constructed of software and a functional unit constructed of a dedicated operation circuit may be used together. For example, each of the functional units shown in the drawing may be constructed of an electronic circuit such as a central processing unit (CPU), an application specific integrated circuit (ASIC), or a programmable logic device (PLD) such as a field programmable gate array (FPGA).

Whether each of the functional units is to be constructed of dedicated hardware or is to be constructed of software so that programs are executed by a CPU is selected in consideration of necessary operating speed, cost, amount of electricity consumed, and other factors. For example, if a specific functional unit is composed of an FPGA, the operating speed is superior, but the production cost is high. On the other hand, if a specific functional unit is configured so that programs are executed by a CPU, the production cost is reduced because hardware resources are conserved. However, when the functional unit is constructed using a CPU, its operating speed is inferior to that of dedicated hardware. Constructing the functional unit by dedicated hardware and constructing the functional unit by software differ from each other, as described above, but are equivalent to each other from the viewpoint of obtaining a specific function.

The image processing device 100 includes an image data storage 101, an operation content receiving unit 102, an image data obtaining unit 103, an exterior orientation parameter obtaining unit 104, and a display controlling unit 105. The image data storage 101 stores image data of photographic images that are photographed from a UAV. The image data is stored in association with a flight log relating to a flight path of the UAV and information relating to the photographing times and the photographing positions.

The operation content receiving unit 102 receives data relating to an operation content of an operator using the image processing device 100. For example, an operator may perform various kinds of work by operating a PC that is operated as the image processing device 100, and an operation content of the operator using the PC is received by the operation content receiving unit 102.

The image data obtaining unit 103 obtains image data of photographic images stored in the image data storage 101. The photographic images are photographed from a camera on the UAV. The exterior orientation parameter obtaining unit 104 obtains the photographing positions and the photographing times of the photographic images, which are obtained from the image data obtaining unit 103, from the image data storage 101. The exterior orientation parameters (position and attitude) of the camera relative to the UAV are preliminarily known, and therefore, the position and the attitude of the camera at the time of photographing are known from the position and the attitude of the UAV at the time of the photographing. The exterior orientation parameters may also be determined by a backward intersection method using coordinate position information of a marker for identifying a position in a photographed image.

The display controlling unit 105 controls displaying data and information on a PC or an appropriate display, such as a liquid crystal display. The data and information include (1) photographic images that are be photographed from the UAV, (2) map information that is preliminarily prepared, (3) information of the flight path obtained from the flight log, information of the photographing positions and the photographing times, and other information necessary for processing data obtained by using the UAV.

Figure 2:
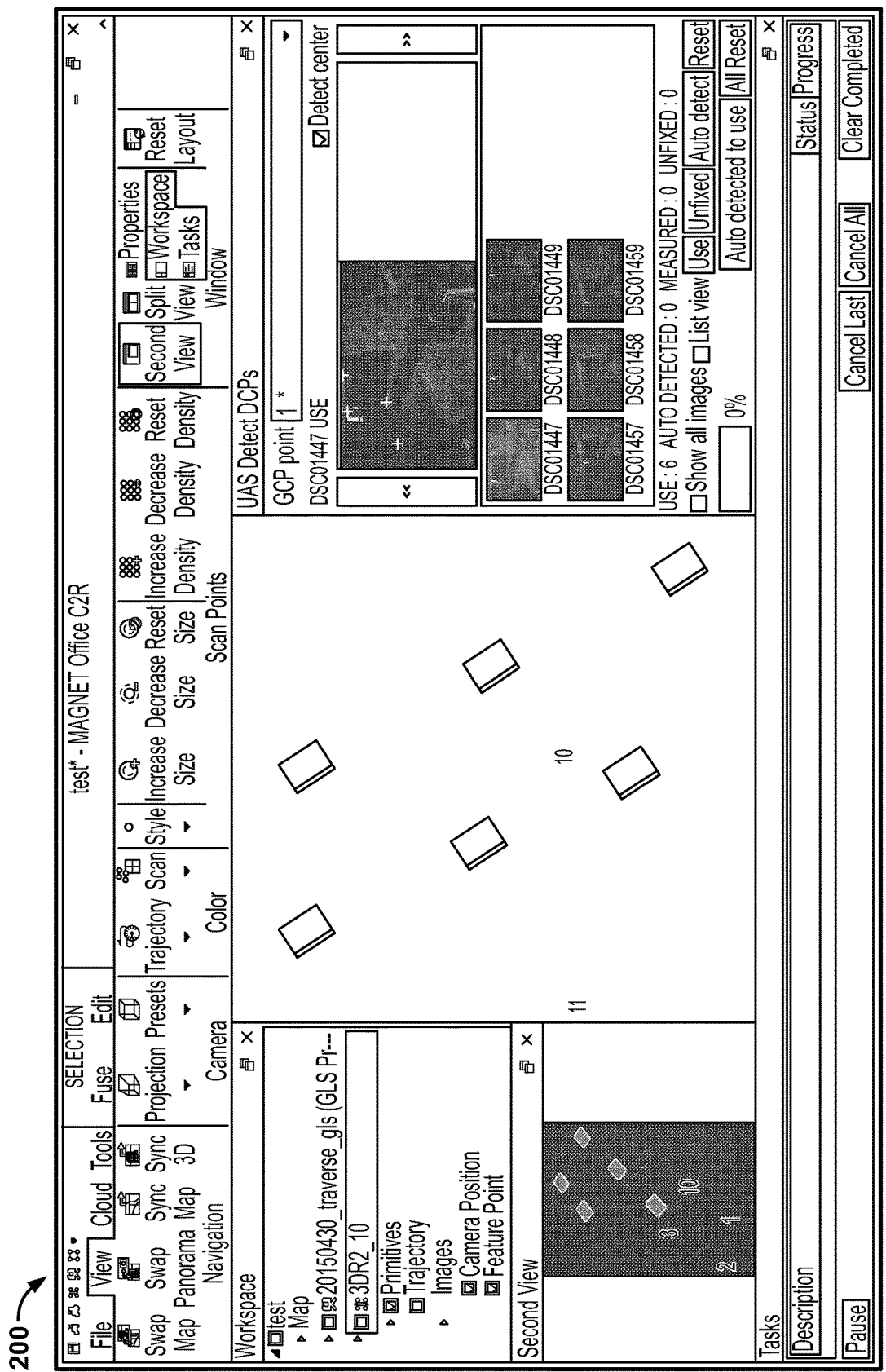
FIG. 2 is a view showing an example of a display screen.

FIG. 2 is a view showing an example of a displayed screen 200 that is controlled by the image display controlling unit 105. FIG. 2 shows a 3D view image at a left side, a map view image at a center, and photographed images at a right side. The 3D view image is an example of a wide area image and three dimensionally shows a relationship between a three-dimensional model, which is generated from the photographed images, or a 3D map, and photographing positions of the UAV. The map view image is another example of a wide area image and is constituted by adding map information to an electronic map or an aerial photograph. Six photographed images are displayed in thumbnail, and one of the thumbnail images is selected and is displayed in an enlarged manner. Although not shown in FIG. 2, indication of the north, south, east and west, and the flight path, may be displayed in each or both of the 3D view image and the map view image.

The map view image shows map information and shows quadrangular marks that indicate respective photographing positions of the six photographic images, which are displayed in thumbnails at the right side. The selected quadrangular-shaped photographic image, which is numbered DSC01447 USE, has an upper side highlighted with a bold line, among the photographic images at the right side. Also, the quadrangular marks at the six photographing positions in the map view image each have a side highlighted with a bold line. The sides highlighted with the bold lines in the map view image at the center respectively correspond to upper sides of the photographic images at the right side. Thus, the photographic image at the right side can be rotated so that its side with the bold line will be directed in the same direction as the side with the bold line of the quadrangular mark in the map view image. This enables intuitive understanding of the direction of the photographic image in the electric map.

An arithmetic operation for determining a side to be highlighted with a bold line among the four sides will be described. First, the direction of the camera at the time of photographing an image is known from the information of the flight log, and the directions of north, south, east, and west in this photographic image are known from this information. On the other hand, since the map view image is based on the map information, the directions of north, south, east, and west in the map view image, as shown at the center in FIG. 2, is also known. Thus, the corresponding relationship between the quadrangular mark in the map view image and the photographic image is determined, and a corresponding relationship of sides between the quadrangular mark and the photographic image is also known. Then, a side to be highlighted with a bold line is determined.

The highlight display enables easy understanding of directional relationship between the map view image, as shown at the center in FIG. 2, and the photographic image at the right side when the map view image is rotated. The same applies to a case in which the photographic image is rotated. The highlighting may be performed by an arrow display, a blinking display, or other displays.

What is claimed is:

1. An image processing device comprising:
   a display controlling unit that:
   displays an aerial photographic image and a wide area image at different positions on a display, the wide area image showing map information;
   displays a mark on the wide area image, the mark indicating a photographing position of the aerial photographic image; and
   highlights a part of an edge of the aerial photographic image and a part of the mark to determine a corresponding relationship between a direction of the aerial photographic image and a direction of the mark,
   wherein each of the aerial photographic image and the mark has a quadrangular shape, one of the four edges of the aerial photographic image and one of the four sides of the mark are highlighted, and the highlighted edge shows a corresponding relationship between a direction of the aerial photographic image and a direction of the mark.

2. The image processing device according to claim 1, wherein the highlights is performed by highlighting the edge of the aerial photographic image which corresponds to a specific edge of the mark.

3. The image processing device according to claim 1, wherein the direction of the quadrangular shape of the aerial photographic image differs from the direction of the quadrangular shape of the mark.

4. An image processing method comprising:
  displaying an aerial photographic image and a wide area image at different positions on a display, the wide area image showing map information;
  displaying a mark on the wide area image, the mark indicating a photographing position of the aerial photographic image; and
  highlighting a part of an edge of the aerial photographic image and a part of the mark to determine a corresponding relationship between a direction of the aerial photographic image and a direction of the mark,
  wherein each of the aerial photographic image and the mark has a quadrangular shape, one of the four edges of the aerial photographic image and one of the four edges of the mark are highlighted, and the highlighted edge shows a corresponding relationship between a direction of the aerial photographic image and a direction of the mark.

5. The image processing method according to claim 4, wherein the direction of the quadrangular shape of the aerial photographic image differs from the direction of the quadrangular shape of the mark.

6. A non-transitory computer recording medium storing computer executable instructions that, when executed by a computer processor, cause the computer processor to:
  display an aerial photographic image and a wide area image at different positions on a display, the wide area image showing map information;
  display a mark on the wide area image, the mark indicating a photographing position of the aerial photographic image;
  highlight a part of an edge of the aerial photographic image and a part of the mark to determine a corresponding relationship between a direction of the aerial photographic image and a direction of the mark;
  display the aerial photographic image and the mark each having a quadrangular shape; and
  highlight one of the four edges of the aerial photographic image and one of the four edges of the mark; and
  wherein the highlighted one edge shows a corresponding relationship between a direction of the aerial photographic image and a direction of the mark.

7. The non-transitory computer recording medium storing computer executable instructions according to claim 6, that, when executed by a computer processor, cause the computer processor to further:
  display the direction of the quadrangular shape of the aerial photographic image that differs from the direction of the quadrangular shape of the mark.

* * * * *